Sept. 18, 1923.                           1,468,195
F. S. CURBELO
MACHINE FOR CUTTING AND STRIPPING CANE
Filed April 11, 1919    5 Sheets-Sheet 1
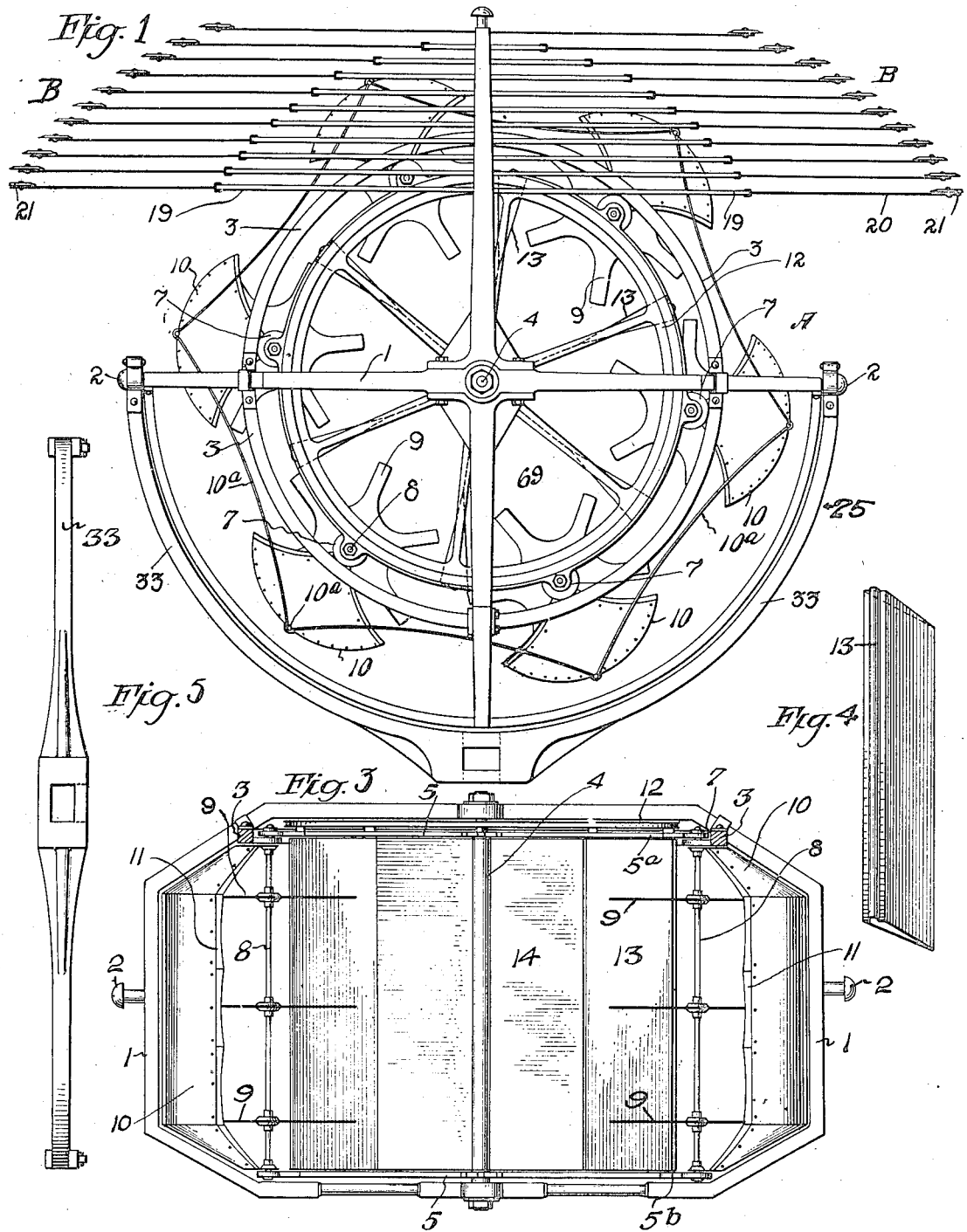

Sept. 18, 1923.
F. S. CURBELO
1,468,195
MACHINE FOR CUTTING AND STRIPPING CANE
Filed April 11, 1919    5 Sheets-Sheet 2
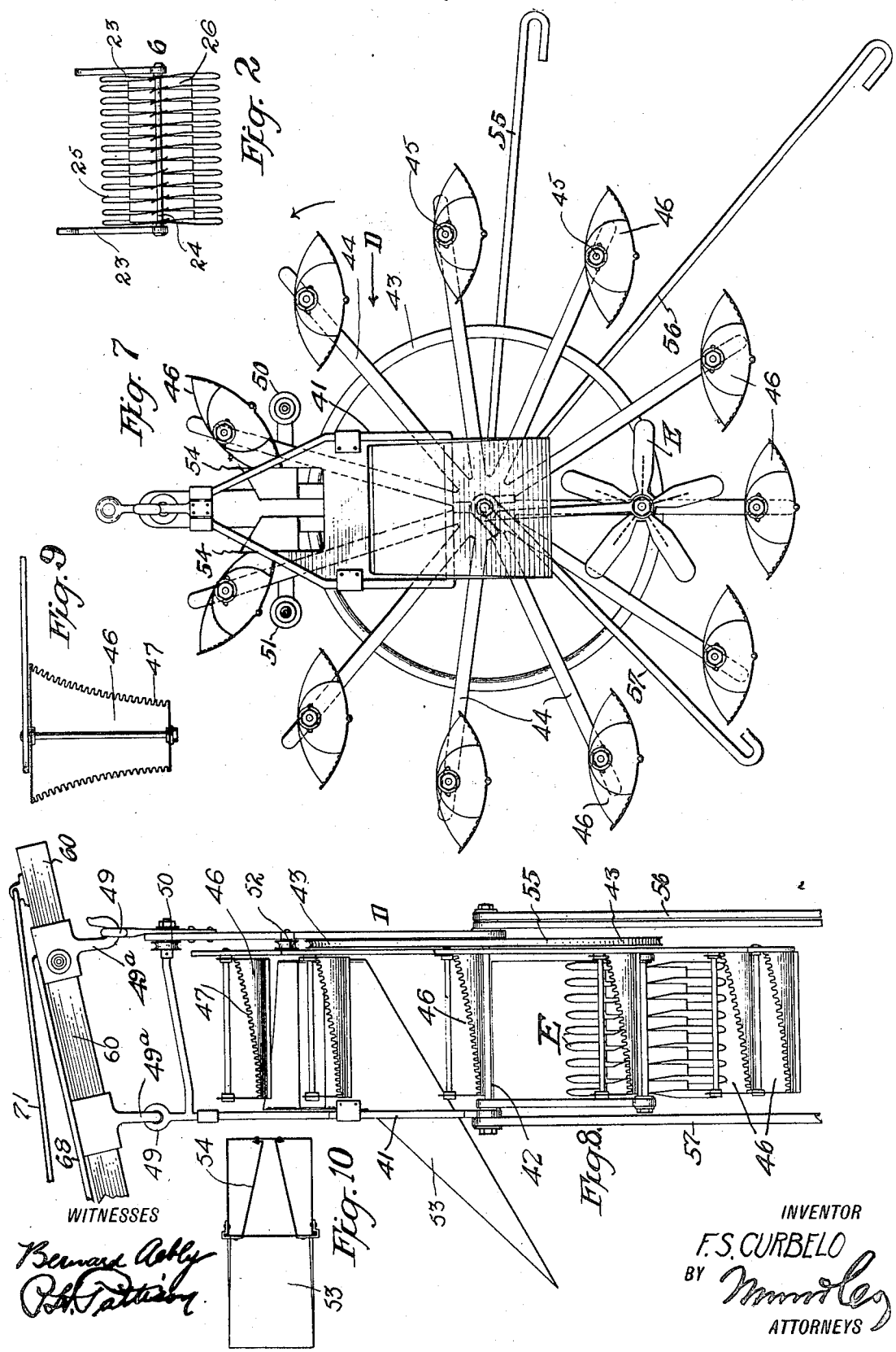
WITNESSES
INVENTOR
F.S. CURBELO
BY
ATTORNEYS

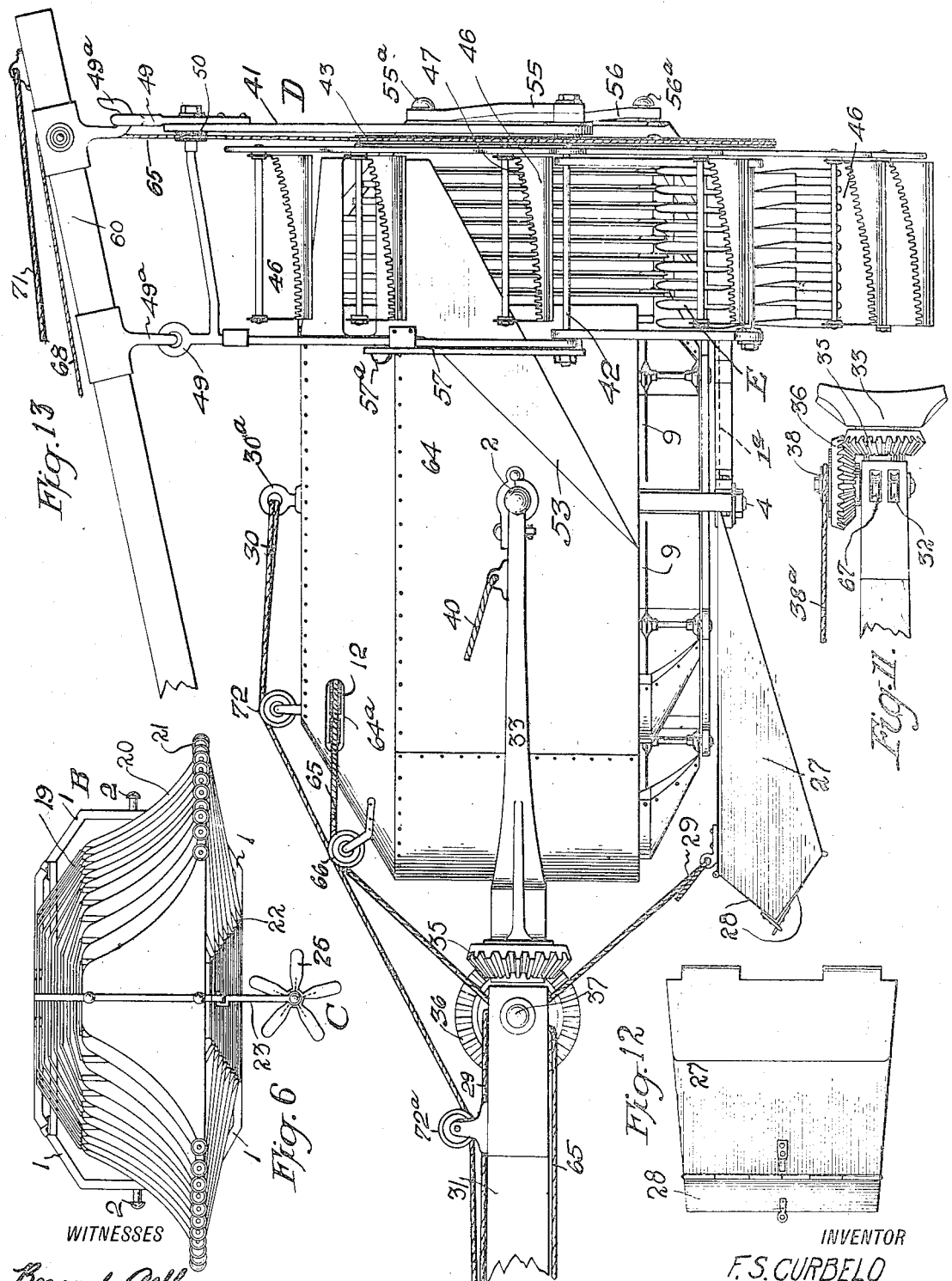

Sept. 18, 1923.
F. S. CURBELO
MACHINE FOR CUTTING AND STRIPPING CANE
Filed April 11, 1919 5 Sheets-Sheet 4
1,468,195
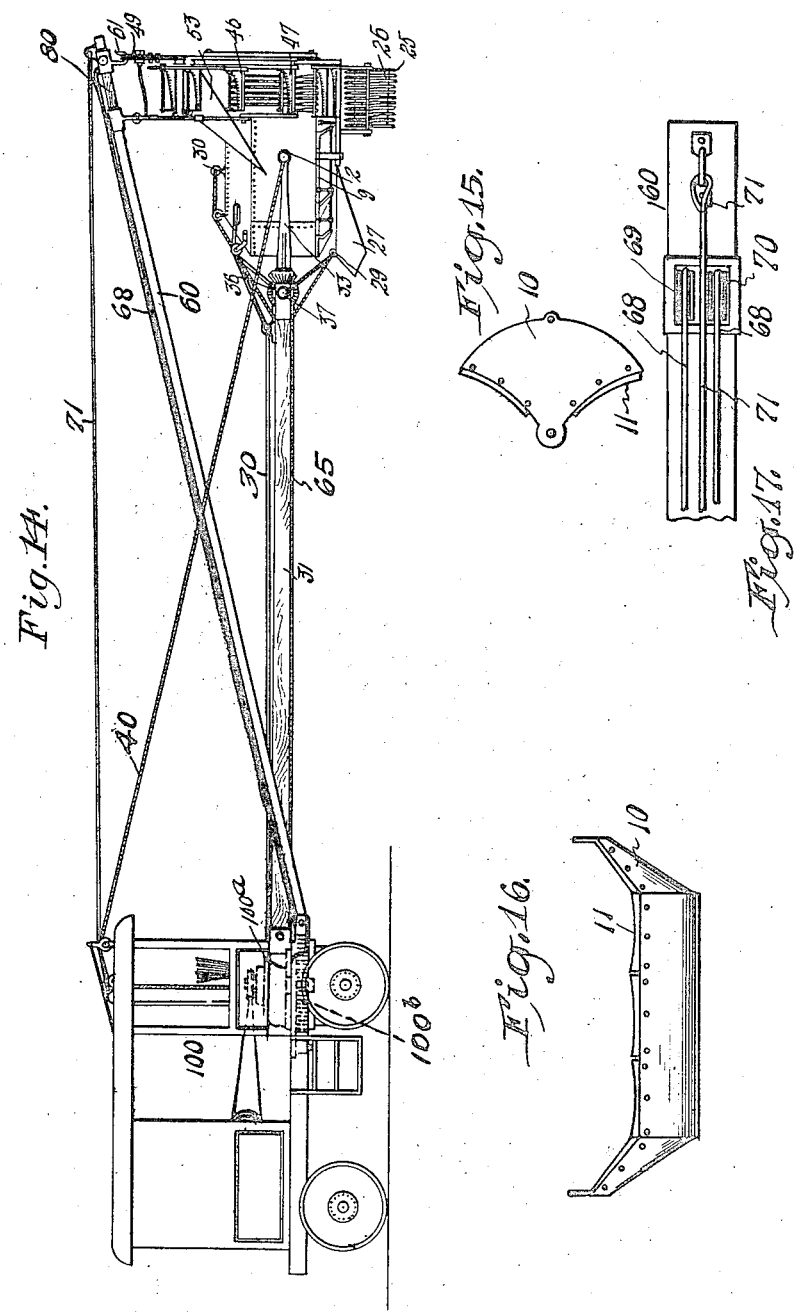
WITNESSES
INVENTOR
F. S. Curbello
BY
ATTORNEYS

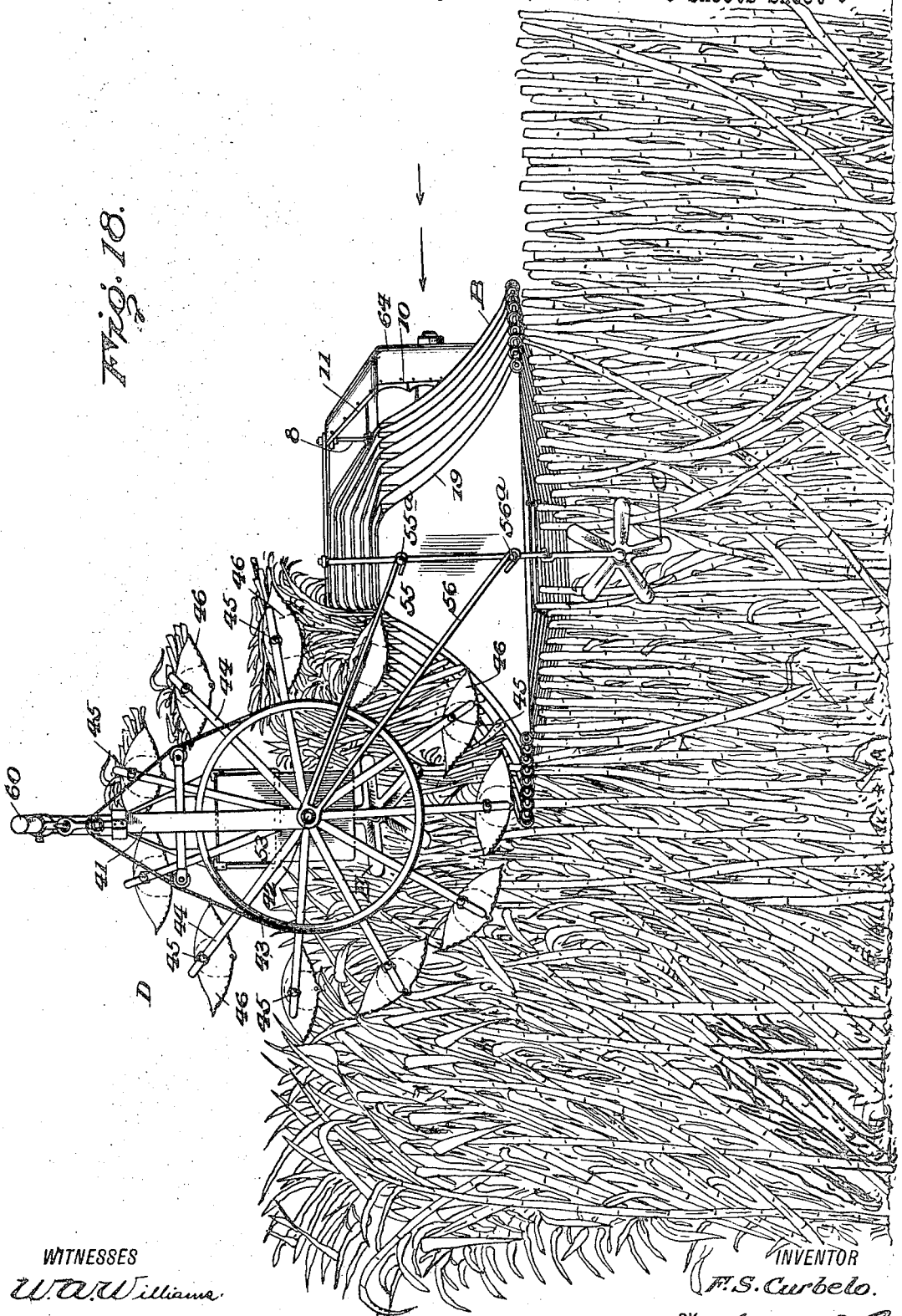

Patented Sept. 18, 1923.

1,468,195

UNITED STATES PATENT OFFICE.

FRANCISCO SAENZ CURBELO, OF CIENFUEGOS, CUBA.

MACHINE FOR CUTTING AND STRIPPING CANE.

Application filed April 11, 1919. Serial No. 289,474.

*To all whom it may concern:*

Be it known that I, FRANCISCO SAENZ CURBELO, a citizen of Cuba, and a resident of Cienfuegos, Cuba, have invented a new and Improved Machine for Cutting and Stripping Cane, of which the following is a full, clear, and exact description.

The present invention relates to new and useful improvements in harvesting machines, and pertains more particularly to a machine for harvesting sugar cane.

The primary object of the invention is to provide a machine which will cut the standing cane, strip the same, remove the heads or tops, and cut the stripped stalk into a plurality of comparatively short lengths.

A further object of the invention is to provide a machine of this character in which the above-mentioned operations are carried on simultaneously.

A further object of this invention is to provide a machine of this character which is power operated.

Referring to the drawings forming part of this application,

Figure 1 is a top plan view of the cutting mechanism and the guiding and stripping means, Figure 2 is a detail view of a stripping device, Figure 3 is a front view of the cutting mechanism, Figure 4 is a detail view of one part of the cutting mechanism, Figure 5 is a detail view of the forked supporting member, Figure 6 is a detail view of the guiding stripping device, Figure 7 is a view in elevation of the top-elevating mechanism, Figure 8 is a side view thereof, Figure 9 is a detail view of an elevating member of the top-elevating mechanism, Figure 10 is a detail view of the chute, Figure 11 is a detail view showing the connection between the supporting yoke and beam, Figure 12 is a top plan view of the hopper, Figure 13 is a side view of the improvement, Figure 14 is a side view of the improvement and a motor car from which the improvement is operated, Figure 15 is an end view of the cutting element, Figure 16 is a plan view of the same, Figure 17 is a detail plan view of a portion of the supporting beam, and Figure 18 is a front view of the machine in working position and showing the relation of the cutting, guiding and stripping and elevating mechanism one to the other.

Referring to the drawings, a skeleton frame 1 is pivotally mounted between the arms of the forked member 33 by the trunnions 2 on said frame, and the said member is revolubly mounted on the beam 31 which is pivotally mounted on a platform $100^a$ revolubly mounted on a motor car 100, and operated by gearing $100^b$ of said car. The front part of the frame 1 extends below the rear part and said front part of the frame is closed at the bottom as shown at $1^a$ in dotted lines in Fig. 13, while the rear part is open at the bottom.

In the frame 1 is mounted a cutting mechanism A. This mechanism consists of a vertical shaft 4 carried by the frame 1 upon which is mounted the frame 5 consisting of upper and lower members $5^a$ and $5^b$. Upon the shaft 4 above the member $5^a$ of the frame 5 is mounted the grooved pulley 12 and between the members of said frame are mounted a plurality of shafts 8. The shafts 8 carry wheels 7 which engage the circular tracks 3. Upon each of the shafts 8 are mounted a plurality of star wheels 9, and carried by said shafts are bucket-like members 10 provided with cutting edges 11. The cutting edges may be integral with the members, or they may be separate therefrom and secured thereto as shown. The bucket-like members 10 are connected with each other by means of bars or rods $10^a$ so as to cause them to move in unison. The star-like members serve to move and hold the cane against the bucket-like members 10, which top and cut the cane into short lengths. Within the frame 5 between the shafts 8 are arranged the guide members 13, V-shape in cross section and which serve to guide the short lengths of cane into the frame. Mounted at its center on shaft 4 is the plate 14 which serves to remove the cut cane from the bottom of the frame 1.

Pivotally mounted below the frame 1 is a hopper 27 into which the cut cane is discharged by the plate 14. The hopper 27 is partially closed at its top, and is provided with a hinged gate 28. To the hopper is secured a cable 29 which passes over the guide pulley 32 in the beam 31 and by which it is lowered to discharge its contents and raised to restore it to normal position.

To the front of the frame 1 is secured a guiding and stripping device B. This device consists of a plurality of spaced substantially triangular members 19 of different sizes giving it the shape shown, which are secured to the upper and lower members of the said frame 1, and have at their angles, wheels 21 adapted to travel on the ground when the device is in its lowermost position, to prevent injury thereto. The members 19 are provided with blades 20 and 22. The blades 20 and 22 serve to strip the cane and the blades 22 in addition to stripping the cane, also serve to raise the cane, which is lying on the ground, thereby permitting all the cane to be cut quite close to the ground. Suspended from the guiding and stripping device B is an auxiliary stripping device C, see Figures 2, 6 and 18. The stripping device C consists of a plurality of blades 25 mounted on the shaft 24, which turns freely in the brackets 23, detachably secured to the frame 1. At one side of the forward end of the cutting mechanism A and the guiding and stripping device B, is the top elevating mechanism D, which also serves to straighten the cane and force it into the guiding and stripping device B. The top elevating mechanism consists of a frame 41 having at its lower end a shaft 42 upon which is mounted a grooved pulley 43 provided with radial arms 44 extending beyond the periphery of the pulley. In the outer ends of the arms 44 are shafts 45 on which are mounted to revolve basket-like members 46 having serrated edges 47. These basket-like members 46 serve to present the cane to the guiding and stripping device B to straighten the cane and to elevate the tops of the cane.

Secured to the frame 41 is an inclined chute 53 having an open upper end arranged in the frame and adapted to receive the tops delivered thereto by the basket-like members 46. The open upper end of the chute within the frame 41, is provided with inclined plates 54 to cause the basket-like members to be tilted to deposit the tops into the said chute. The frame 41 is detachably supported from a beam 60 pivotally mounted on the platform of the motor car and is connected with the frame 1 and the casing 64 which encloses the cutting mechanism A. For this purpose, the frame 41 is provided with eyes 49 for engaging hooks 49ª on the beam 60. On the shaft 42 are mounted arms 55, 56 and 57 having hooks at their ends. The arms 55 and 56 engage projections 55ª and 56ª on the frame 1 and the arm 57 a projection 57ª on the said casing. By this means, the frame 41 and its mechanism can be readily attached or detached. From the shaft 42 of the frame 41 is suspended a stripping device E, similar in construction to the stripping device C.

To permit the forked member 33 to be turned on the beam 31, so as to incline the cutting mechanism laterally, the member 33 carries a gear wheel 35 which meshes with a gear wheel 36 mounted in the beam 31, and upon whose shaft a pulley 38 is mounted and around which a cable 38ª passes. A cable 40 is secured to each arm of the forked member 33 so as to permit the beam 31 and all the parts carried thereby to be raised and lowered.

The cutting mechanism is operated by a cable 65 passing around the pulley 12 out through the guide openings 64ª of the casing 64 and over the guide pulleys 66 and 67, the pulley 66 being on the casing and the pulley 67 on the beam 31. A cable 68 passes around the pulley 43 of the top elevating mechanism, over guide pulleys 50 and 51 carried by the frame 41 and thence over guide pulleys 69 and 70 on the beam 60 as shown in Fig. 17. For raising and lowering the beam 60, a cable 71 is attached thereto. In order to give an inclination to the cutting mechanism, a cable 30 is attached to the eye 30ª on the casing and passes over guide pulley 72 on the casing, and thence over guide pulley 72ª on the beam 31. All of the cables extend to the motor car and around drums operated by the motor car and under the control of the operator.

The operation is as follows: The platform of the motor car is caused to rotate so as to swing the several mechanisms to one side, say to the left, to a point approximately at right angles to the line of travel of the motor car, and then the mechanisms are lowered into the cane. The cutting and top-elevating mechanisms are then set in motion from the motor car by their cables and the platform of the motor car rotated in the opposite direction, that is, toward the right when the several mechanisms will travel in a curved path, through the cane. During this movement the top elevating mechanism D will strip and force the cane into the guide and stripping device B which will, in turn, guide it to the cutting mechanism A. The cutting mechanism cuts the cane a distance below the tops and simultaneously cuts off the tops of the said portions and also cutting the remaining portions into short lengths. The tops which are engaged by the basket like members 46 fall into the said baskets and are delivered into the chute 53 from which they are delivered to one side of the machine. The short lengths of cane fall to the bottom of the frame and are discharged from the said frame into the hopper 27 by the plate 14. When the end of movement of the parts in this direction has been reached, the hopper 27 is lowered and its gate opened so as to discharge the cane therefrom. The stripping devices C and E carried by the guiding device and top-elevating mechanism strip the cane below the cut that is, the cane left standing. The top elevating mechanism D is removed and attached at the other side of the cutting mechanism and guiding and stripping devices and the mechanisms being again lowered into the cane from which a cut has been made, the mechanism is caused to move toward the left to make a second cut. It is to be understood that in this second cut and in the succeeding cuts except those close to the ground the elevating mechanism serves only to strip the cane and guide it to the stripping device C. This operation is repeated until the cane in the row has been cut. Before making the cuts close to the ground the stripping devices C and E are removed. In making this last cut of the row, the wheels of the guiding and stripping device B travel on the ground and the blades 22 thereof raise the stalks lying on the ground. The above operation is repeated until the whole field of cane has been cut.

Having thus described the invention, what is claimed as new is:

1. A cane cutting machine, comprising a frame, means for adjustably supporting said frame, a cutting mechanism carried by the frame, means for guiding the stalks to be cut to said cutting mechanism, a plurality of rotatably mounted baskets, for receiving the tops cut from said stalks, a hopper, a chute, means for delivering the stalks to said hopper, and means for tilting the baskets to deliver the severed tops from the baskets to said chute.

2. A cane cutting machine, comprising a cutting mechanism for cutting the tops from the standing cane stalks and simultaneously cutting the cane stalks into short pieces, a receiver into which the pieces of cut cane are delivered, means for discharging the cut pieces of cane from the receiver, and a top elevating mechanism for receiving the tops and delivering them at one side of the machine.

3. A cane cutting machine, comprising a cutting mechanism for cutting the tops from the standing cane stalks and simultaneously cutting the cane stalks into short pieces, a device for guiding the cane stalks to the cutting mechanism and simultaneously stripping the same, and a stripping and top elevating mechanism at one side of the cutting mechanism for receiving the tops and delivering them separate from the short pieces.

4. A cane cutting machine, comprising a frame, a cutting mechanism mounted in the frame for cutting the cane stalks into short lengths and cutting the tops therefrom, means for guiding the cane stalks to the cutting mechanism, a top elevating mechanism, a chute into which the tops are delivered by the top elevating mechanism, and a pivoted hopper into which the short lengths are delivered.

5. A cane cutting machine, a cutting mechanism for cutting the cane stalks into short lengths and severing the tops therefrom, a guiding device for guiding the cane stalks to the cutting mechanism, said guiding device being provided with stripping blades, a stripping device carried by the guiding device below the same, an elevating mechanism for receiving the tops, a stripping device carried by the top elevating mechanism, a chute into which the tops are delivered by he elevating mechanism, and a pivoted hopper into which the short lengths of cane are received.

6. In a cane cutting machine, a cutting mechanism mounted to swing laterally in the arc of a circle for cutting the cane stalks into short pieces, mechanical means for swinging said cutting mechanism, and means for operating the cutting mechanism during the swinging movement thereof.

7. In a cane cutting machine, a frame mounted to swing laterally in the arc of a circle, a cutting mechanism mounted in the frame for cutting sections from the standing cane stalks and simultaneously cutting the tops off the upper sections and the other sections into short pieces, a stripping device carried by the frame in front of the cutting mechanism, and means for swinging the said frame.

8. In a cane cutting machine, a vertically and laterally swinging frame, a cutting mechanism mounted in the frame for cutting the sections from the standing cane stalks and simultaneously cutting the tops of the upper sections and the other sections into short pieces, a guiding and stripping device carried by the frame in front of the cutting mechanism, a top elevating and delivery means mounted at one side of the cutting mechanism and connected with the frame, means for swinging the frame laterally back and forth and means for raising and lowering the frame.

9. In a cane cutting machine, a frame mounted to swing vertically and laterally, a cutting mechanism mounted in the frame for cutting sections from the cane stalks and cutting the tops of the upper sections and the other sections into short lengths, means for swinging the frame laterally from side to side, means for raising and lowering the frame, and a stripping and top elevating mechanism detachably connected with the frame to permit it to be located at either side of the cutting mechanism.

FRANCISCO SAENZ CURBELO.